United States Patent
Sakata et al.

(10) Patent No.: US 12,153,405 B2
(45) Date of Patent: Nov. 26, 2024

(54) CONTROL SYSTEM AND CONTROL METHOD THEREFOR

(71) Applicant: Hitachi, Ltd., Tokyo (JP)

(72) Inventors: Teruaki Sakata, Tokyo (JP); Yusaku Otsuka, Tokyo (JP); Toshiki Shimizu, Tokyo (JP); Manabu Sasamoto, Tokyo (JP); Noritaka Matsumoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 315 days.

(21) Appl. No.: 17/502,455

(22) Filed: Oct. 15, 2021

(65) Prior Publication Data

US 2022/0121179 A1 Apr. 21, 2022

(30) Foreign Application Priority Data

Oct. 16, 2020 (JP) .................................. 2020-174489

(51) Int. Cl.
*G06F 11/20* (2006.01)
*G05B 9/02* (2006.01)
*G05B 19/418* (2006.01)

(52) U.S. Cl.
CPC ......... *G05B 19/41835* (2013.01); *G05B 9/02* (2013.01); *G06F 11/202* (2013.01); *G05B 2219/31229* (2013.01); *G05B 2219/34482* (2013.01)

(58) Field of Classification Search
CPC .. G06F 11/202; G06F 11/2023; G06F 11/203; G05B 23/0259
See application file for complete search history.

(56) References Cited

U.S. PATENT DOCUMENTS

| | | | | |
|---|---|---|---|---|
| 5,963,448 A | * | 10/1999 | Flood | G06F 11/2097 700/19 |
| 6,363,497 B1 | * | 3/2002 | Chrabaszcz | H04L 41/0663 714/E11.073 |
| 2004/0111455 A1 | * | 6/2004 | Skull | G06F 7/507 708/233 |
| 2011/0213753 A1 | * | 9/2011 | Manmohan | G06F 11/2023 714/10 |
| 2018/0059963 A1 | * | 3/2018 | Samii | G06F 3/0619 |
| 2019/0042378 A1 | * | 2/2019 | Wouhaybi | G06F 11/2023 |

(Continued)

FOREIGN PATENT DOCUMENTS

| | | | | |
|---|---|---|---|---|
| EP | 2228723 A1 | * | 9/2010 | ............ G06F 11/165 |
| JP | 09-330106 A | | 12/1997 | |
| JP | 2007-274255 A | | 10/2007 | |

*Primary Examiner* — Yolanda L Wilson
(74) *Attorney, Agent, or Firm* — MATTINGLY & MALUR, PC

(57) ABSTRACT

A control system in which a plurality of controllers and a redundant controller are connected to a common network, the plurality of controllers are divided into a highly available controller and other normal controllers, the redundant controller obtains context data of the highly available controller to hold the context data in a memory, holds programs of the plurality of controllers in a non-volatile memory, and holds the program of the highly available controller in the memory, and an arithmetic unit substitutes processing of the highly available controller by using the context data and the program of the highly available controller held in advance in the memory when a failure occurs in the highly available controller.

4 Claims, 16 Drawing Sheets

(56) References Cited

U.S. PATENT DOCUMENTS

2019/0340116 A1* 11/2019 Miyauchi .............. G06F 11/203
2020/0042410 A1*  2/2020 Gupta ................. H04L 67/1097
2021/0223761 A1*  7/2021 Flood ................ H04L 12/40143

* cited by examiner

| No. | CONTROLLER NAME | PROCESSING CONTENT | CONTROL TARGET | SWITCHING ALLOWABLE TIME |
|---|---|---|---|---|
| 1 | CONTROLLER A | DATA INPUT | IMAGE SENSOR | 5.00 |
| 2 | CONTROLLER B | CALCULATION | --- | 0.85 |
| 3 | CONTROLLER C | ACTUATION | MOTOR | 0.01 |

D31, D32, D33, D34, D35

CONTROL SYSTEM AND CONTROL METHOD THEREFOR

CLAIM OF PRIORITY

The present application claims priority from Japanese Patent application serial No. 2020-174489, filed on Oct. 16, 2020, the content of which is hereby incorporated by reference into this application.

BACKGROUND OF THE INVENTION

1. Field of the Invention

The present invention relates to a control system that performs control using a controller and a control method thereof in the fields of plants, factory automation (FA), and the like.

2. Description of the Related Art

In a social infrastructure system such as steel, vertical water treatment, a factory, and a power plant, automation and efficiency of a control system are improved by arranging a large number of controllers that execute control arithmetic processing to configure the control system.

In such a control system, a controller acquires state quantities such as a flow rate, a temperature, a pressure, a tension, and a rotational speed from a device such as a sensor arranged in a field, performs desired calculation by an arithmetic processing device included in the controller, and performs control in real time by repeating processing of outputting a control command as control data (signal) to an operation device such as an actuator arranged in the field.

In addition, in a control system such as a large-scale plant, a plurality of controllers are connected via a common network to constitute a distributed control system. In the case of such a distributed control system, a plurality of sensor values installed in a vast field are aggregated and calculated by one controller, or processing such as a controller that performs calculation and a controller that outputs a control command is shared, thereby performing efficient processing.

The control system is a core of the operation of the social infrastructure system, and the operation thereof requires very high safety and reliability. In the control system in which the processing is distributed as described above, a mechanism for preventing propagation to the entire system even if a failure or a damage occurs in a part of the system is required.

As a background art of this technical field, there is JP 9-330106 A. JP 9-330106 A discloses that in a control system of a 1:N backup method, a backup switching time at the time of occurrence of abnormality is shortened to ensure good continuity of control.

As another background art, there is JP 2007-274255 A. JP 2007-274255 A discloses that one reserve system node is provided for a plurality of operation system nodes, during normal operation, the operation system node duplicates data by using a reserve system memory region of a shared memory on another operation system node as the reserve system memory, when the operation system node fails, a maintenance node instructs the operation system node to switch a system, another operation system node becomes a new operation system node instead of the failed operation system node, the new operation system node uses the reserve system memory region on another operation system node used by the failed operation system node as the reserve system memory, and when the new operation system node refers to the operation system memory region, data on the reserve system memory region of another operation system node is transferred to the operation system memory region, and thereby it is possible to refer to data that has been referred to by the failed operational system node.

SUMMARY OF THE INVENTION

Meanwhile, in the configuration in JP 9-330106 A, it is necessary to download a control program of a controller in which a failure occurs when a failure occurs in a certain controller to a backup controller via a network, and thus, there is a problem that it is difficult to apply the configuration to backup to a system in which a time margin for switching such as actuation control is very short.

In addition, the configuration in JP 2007-274255 A is a configuration in which a memory region on a certain operation system is matched with a memory region on a reserve system node. However, there is a problem that it is difficult to apply the configuration to a system having a very short time margin for switching because there is no description that data of a failed operation system node is preferentially transferred at the time of failure of the operation system node that is not matched.

Therefore, the present invention provides a control system and a control method for the control system that realize low-cost redundancy in which the entire system can continue operation even when a failure occurs in some controllers in a distributed control system in which each controller performs different processing.

From the above, the present invention is configured as "a control system in which a plurality of controllers and a redundant controller are connected to a common network, wherein the plurality of controllers are divided into a highly available controller and other normal controllers, the redundant controller obtains context data of the highly available controller to hold the context data in a memory, holds programs of the plurality of controllers in a non-volatile memory, and holds the program of the highly available controller in the memory, and an arithmetic unit substitutes processing of the highly available controller by using the context data and the program of the highly available controller held in advance in the memory when a failure occurs in the highly available controller".

Further, the present invention is configured as "a control system in which a plurality of controllers and a redundant controller are connected to a common network, wherein the plurality of controllers are divided into a highly available controller and other normal controllers, the redundant controller obtains context data of the highly available controller to hold the context data in a first memory, holds programs of the plurality of controllers in a non-volatile memory, and holds the program of the highly available controller in the first memory, the redundant controller obtains information on occurrence of a failure in the controller via the common network, transfers the program of the normal controller in which the failure has occurred from the non-volatile memory to a second memory, obtains context data of the normal controller in which the failure has occurred via the common network, and holds the context data in the second memory, and the redundant controller includes an arithmetic unit that substitutes processing of the highly available controller by using the context data and the program of the highly available controller held in the first memory when a failure occurs in the highly available controller, and substitutes processing of the normal controller by using context data and a program of the normal controller held in the second memory when a failure occurs in the normal controller".

Further, the present invention is configured as "a control method for a control system in which a plurality of controllers and a redundant controller are connected to a common network, the plurality of controllers being divided into a highly available controller and other normal controllers, the method including, by the redundant controller: obtaining context data of the highly available controller to hold the context data in a memory; holding programs of the plurality of controllers in a non-volatile memory; holding the program of the highly available controller in the memory; and substituting processing of the highly available controller by using the context data and the program of the highly available controller held in advance in the memory when a failure occurs in the controller".

Further, the present invention is configured as "a control method for a control system in which a plurality of controllers and a redundant controller are connected to a common network, the plurality of controllers being divided into a highly available controller and other normal controllers, the method including, by the redundant controller: a first step of obtaining context data of the highly available controller to hold the context data in a memory, holding programs of the plurality of controllers in a non-volatile memory, and holding the program of the highly available controller in the memory; a second step of substitutes processing of the highly available controller by using the context data and the program of the highly available controller held in advance in the memory when a failure occurs in the highly available controller; a third step of obtaining information on occurrence of a failure in the controller via the common network, transferring a program of the normal controller in which the failure has occurred from the non-volatile memory to the memory, obtaining context data of the normal controller in which the failure has occurred via the common network to hold the context data in the memory; a fourth step of substituting processing of the normal controller by using the context data and the program of the normal controller held in the memory; a fifth step of determining whether the failure occurs in the highly available controller or the normal controller and distinguishing and transitioning between the second step and the fourth step; and a sixth step of transitioning to the first step after recovery from the failure".

Further, the present invention is configured as "a control method for a control system in which a plurality of controllers and a redundant controller are connected to a common network, the plurality of controllers being divided into a highly available controller and other normal controllers, the method including, by the redundant controller: holding programs of the plurality of controllers in a non-volatile memory; obtaining information on occurrence of a failure in the controller via the common network; transferring a program of the normal controller in which the failure has occurred from the non-volatile memory to a memory; obtaining context data of the normal controller in which the failure has occurred via the common network to hold the context data in the memory; substituting processing of the normal controller by using the context data and the program of the normal controller held in the memory; obtaining the context data of the highly available controller to hold the context data in the memory when obtaining information on occurrence of a failure in the highly available controller in a step of substituting the processing of the normal controller by the redundant controller via the common network; holding a program of the highly available controller in a memory; and degenerating processing of the highly available controller by using the context data and the program of the highly available controller held in advance in the memory when the failure occurs in the highly available controller".

According to the present invention, high availability can be realized at low cost in a control system in which it is difficult to temporarily stop the system even when a failure occurs.

Problems, configurations, and effects other than those described above will be clarified by the following description of embodiments.

BRIEF DESCRIPTION OF THE DRAWINGS

FIG. 5 is a block diagram illustrating an example of a requirement determination table according to the first embodiment;

DESCRIPTION OF THE PREFERRED EMBODIMENTS

Figure 1:
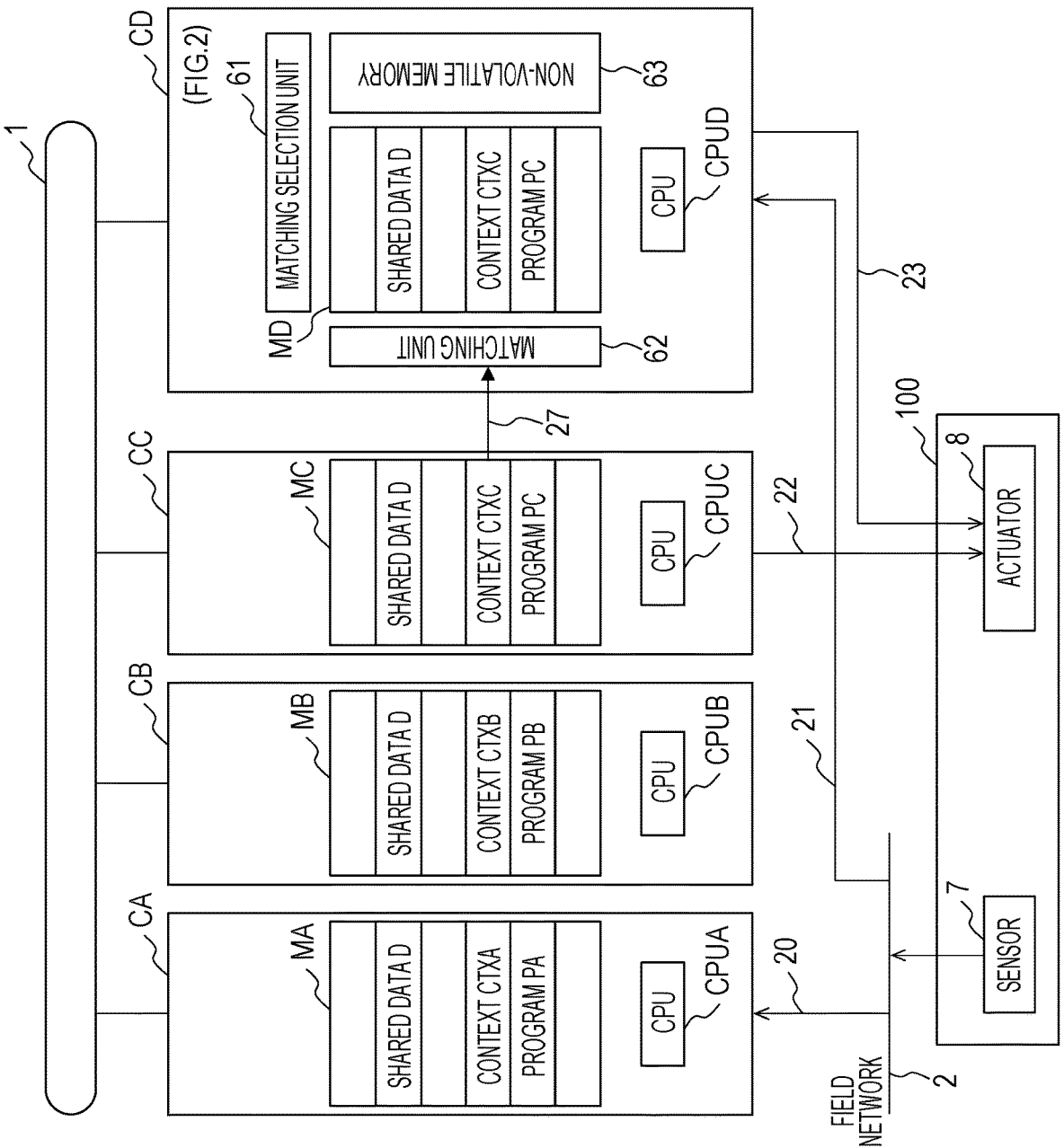
FIG. 1 is a block diagram illustrating a configuration example of a control system according to the first embodiment.

Hereinafter, embodiments of the present invention will be described with reference to the drawings. Note that, in the specification and the drawings, components having substantially the same function or configuration are denoted by the same reference numerals, and in a case where descriptions thereof overlap, the description thereof may be omitted.

First Embodiment

A control system according to a first embodiment of the present invention will be described with reference to FIGS. 1 to 8.

FIG. 1 is a block diagram illustrating a configuration example of a control system according to the first embodiment.

The control system according to the first embodiment has a configuration in which a plurality of controllers C (CA, CB, CC, and CD) are connected to a common network 1. Among them, the controller CA is an input controller that obtains detection signals 20 in various sensors 7 in a control target plant 100 via a field network 2, the controller CB is a control controller that obtains the detection signals 20 obtained by the controller CA via the common network 1 and executes various control calculations for plant control, and the controller CC is an output controller that obtains the calculation results in the controller CB via the common network 1 and gives an operation signal 22 to an actuator 8 that is an operation end in the control target plant 100.

In the configuration example of the control system in FIG. 1, the plurality of controllers CA, CB, and CC are allocated to processing of each function of input processing, arithmetic processing, and output processing to form a distributed control system in which functions are distributed. However, in the present invention, a distribution method may be performed from any viewpoint as long as the distribution control is performed by a plurality of controllers.

In FIG. 1, the controller CD is a redundant controller that substitutes and executes a function of a down controller without delay when a part of a plurality of controllers CA, CB, and CC is down. It is desirable that the redundant controller CD has a full-duplex configuration capable of substituting the functions of all the distributed controllers CA, CB, and CC, and it is desirable that at least one function can be substituted from the viewpoint of cost reduction.

For this reason, in the present invention, the output controller CC, which is a specific controller set in advance, is regarded as a highly available controller, and a preliminary measure of matching the program and the context data is taken for the highly available controller before occurrence of failure, so that substitution can be performed without delay at the time of occurrence of failure. In addition, for another controller (hereinafter referred to as a normal controller) having low urgency of switching, substitution processing is executed after the occurrence of failure. Note that, in the following description, transmitting and giving context data, in particular, of the highly available controller to the redundant controller CD before the occurrence of failure may be simply referred to as "matching".

The controller C (CA, CB, CC, CD) incorporates an arithmetic unit central processing unit (CPU) and a memory M. Each arithmetic unit CPU is CPUA, CPUB, CPUC, or CPUD, and each memory M is MA, MB, MC, or MD. In the memory M, MA, MB, and MC each have a region for holding a program P (PA, PB, PC) operating in each of the controllers CA, CB, and CC, a context CTX (CTXA, CTXB, CTXC) indicating an operation state of each of the controllers CA, CB, and CC, and shared data D shared among the controllers CA, CB, and CC via a shared network 1. Note that the context indicates that the same code description or element on the program behaves differently or receives different restrictions depending on a position in the program in which the same code description or element on the program is placed, an internal state when the same code description or element is executed, or the like.

In addition to the arithmetic unit CPUD and the memory MD, the redundant controller CD that performs the redundancy processing further includes a matching selection unit 61, a matching unit 62, and a non-volatile memory 63. In this example, the memory MD in the redundant controller CD has a program PC that operates on the controller CC, a context CTXC that indicates the state of the controller CC, and a region that can hold the shared data D shared among the controllers CA, CB, and CC via the shared network 1.

In addition, in the example of the control system of FIG. 1, the sensor input 20 of the sensor 7 connected to the field network 2 is input to the controller CA and is also input to the redundant controller CD as a sensor input 21. The actuator 8 is operated by an actuator output 22 from the controller CC and controlled by an actuator output 23 from the redundant controller CD.

In the control system of FIG. 1, the controller CA receives an input from the sensor 7 and shares data with other controllers CB and CC via the common network 1, the controller CB calculates control data from the shared input data, and the controller CC performs processing of outputting the shared control data to the actuator 8.

Here, the actuator 8 directly controls a device in response to a control command from the control system, and thus the controller CC is required to have high safety and reliability even when a failure occurs. Here, such a controller is referred to as a highly available controller. On the other hand, the controllers CB and CC that are not highly available controllers CC are referred to as normal controllers. Here, although a leased line 27 is provided in FIG. 1 as a transmission unit for storing the context CTXC of the controller CC in the memory MD of the redundant controller CD, this may be obtained via the common network 1.

Figure 2:
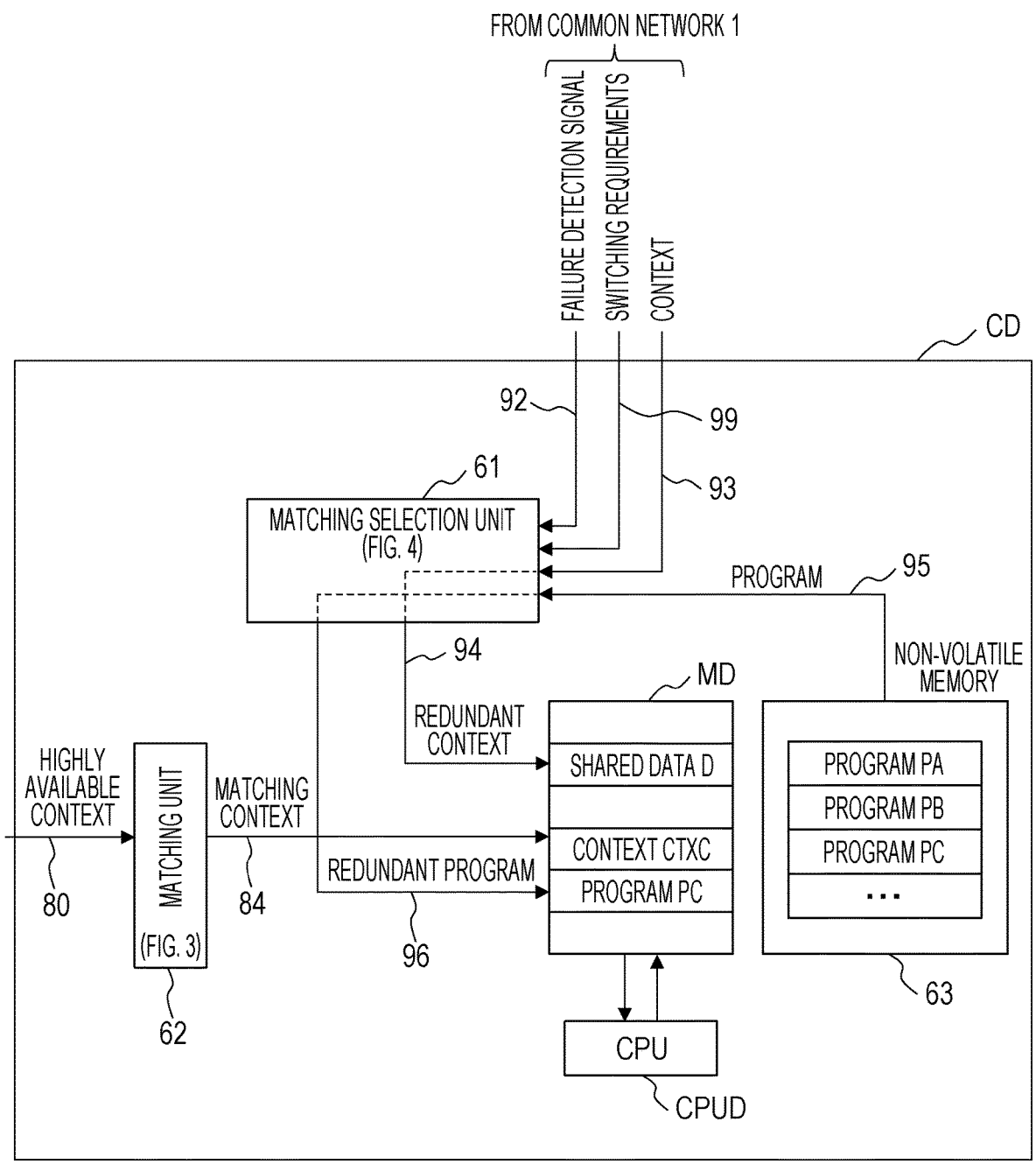
FIG. 2 is a block diagram illustrating a configuration example of a redundant controller according to the first embodiment.

FIG. 2 is a block diagram illustrating a configuration example in the redundant controller CD according to the first embodiment. In FIG. 2, the non-volatile memory 63 holds programs P (PA, PB, PC) of controllers CA, CB, and CC other than the redundant controller CD, and here, a program PA of the controller CA, a program PB of the controller CB, and a program PC of the controller CC are held.

The matching selection unit 61 receives information on a failed controller via the common network 1. Here, the information of the failed controller obtained via the common network 1 includes a failure detection signal 92, a switching requirement 99, and a context 93. Although details will be described later with reference to FIG. 4, the matching selection unit 61 has a function of extracting the program 95 of the corresponding controller from the non-volatile memory 63 and loading the program into the memory MD as the redundant program 96. In addition, the matching selection unit 61 has a function of loading the context 93, which is information of a failed controller obtained via the common network 1, as the redundant context 94 to the shared data D of the memory MD.

Meanwhile, the matching unit 62 performs a process of transferring and copying the highly available context 80 of the controller CC positioned as the highly available controller to the memory MD of the redundant controller CD as the matching context 84. In this example, the context CTXC of the controller CC, which is a highly available controller, is copied, and the program PC of the controller CC is held in the memory MD and processed by the arithmetic unit CPUD.

Figure 3:
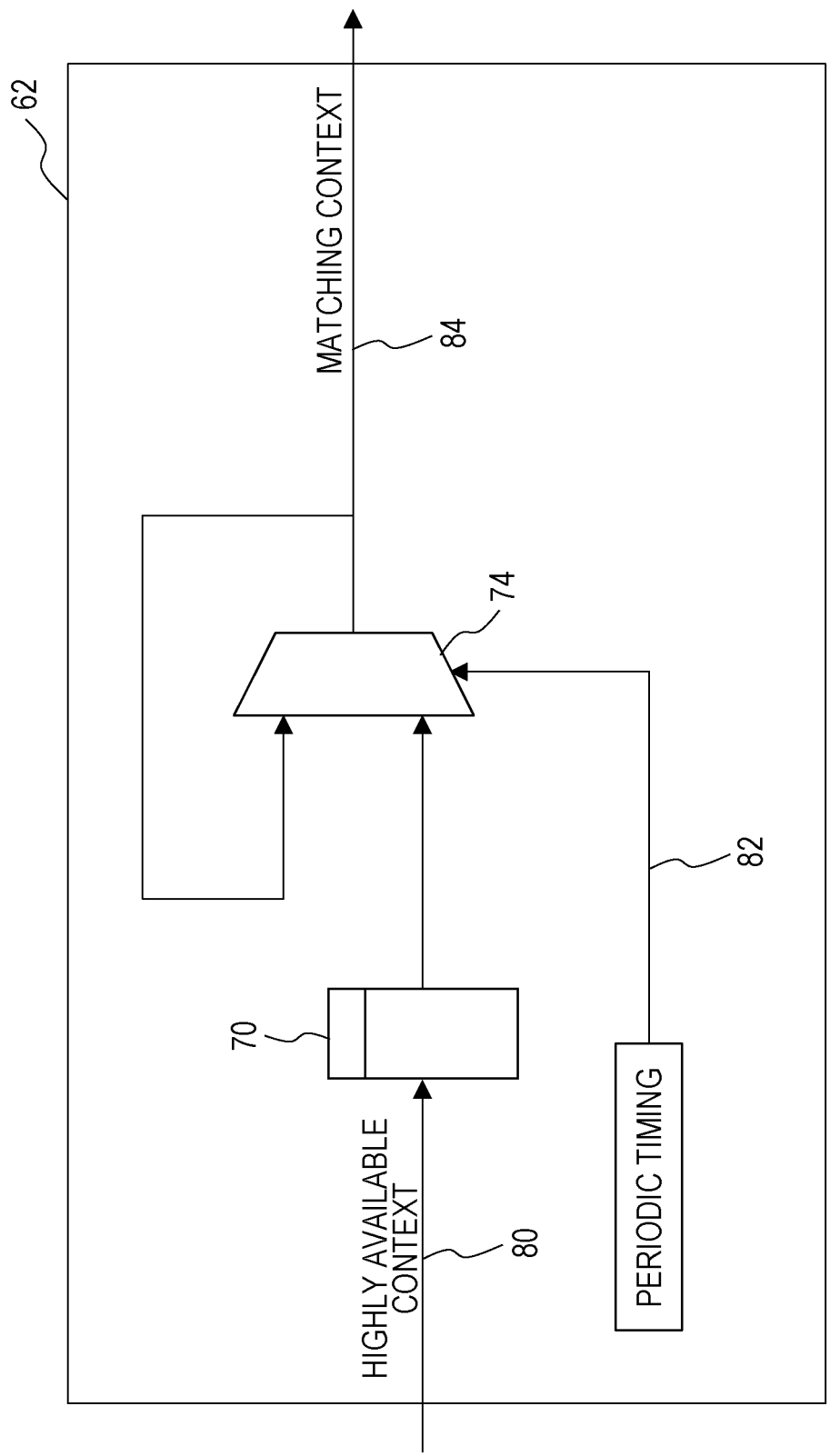
FIG. 3 is a block diagram illustrating a configuration example of a matching unit according to the first embodiment.

FIG. 3 is a block diagram illustrating the matching unit 62 according to the first embodiment. Highly available context data 80 is held by a buffer 70 and selected from the multiplexer 74 by a periodic timing 82 to be output as matching context data 84. As a result, in the memory MD of the redundant controller CD, the highly available context 80 of the controller CC positioned as the highly available controller before the occurrence of the failure is obtained without delay every time the periodic timing 82 occurs. As a result, the highly available controller CC and the redundant controller CD are matched in context from a stage before the occurrence of failure.

Figure 4:
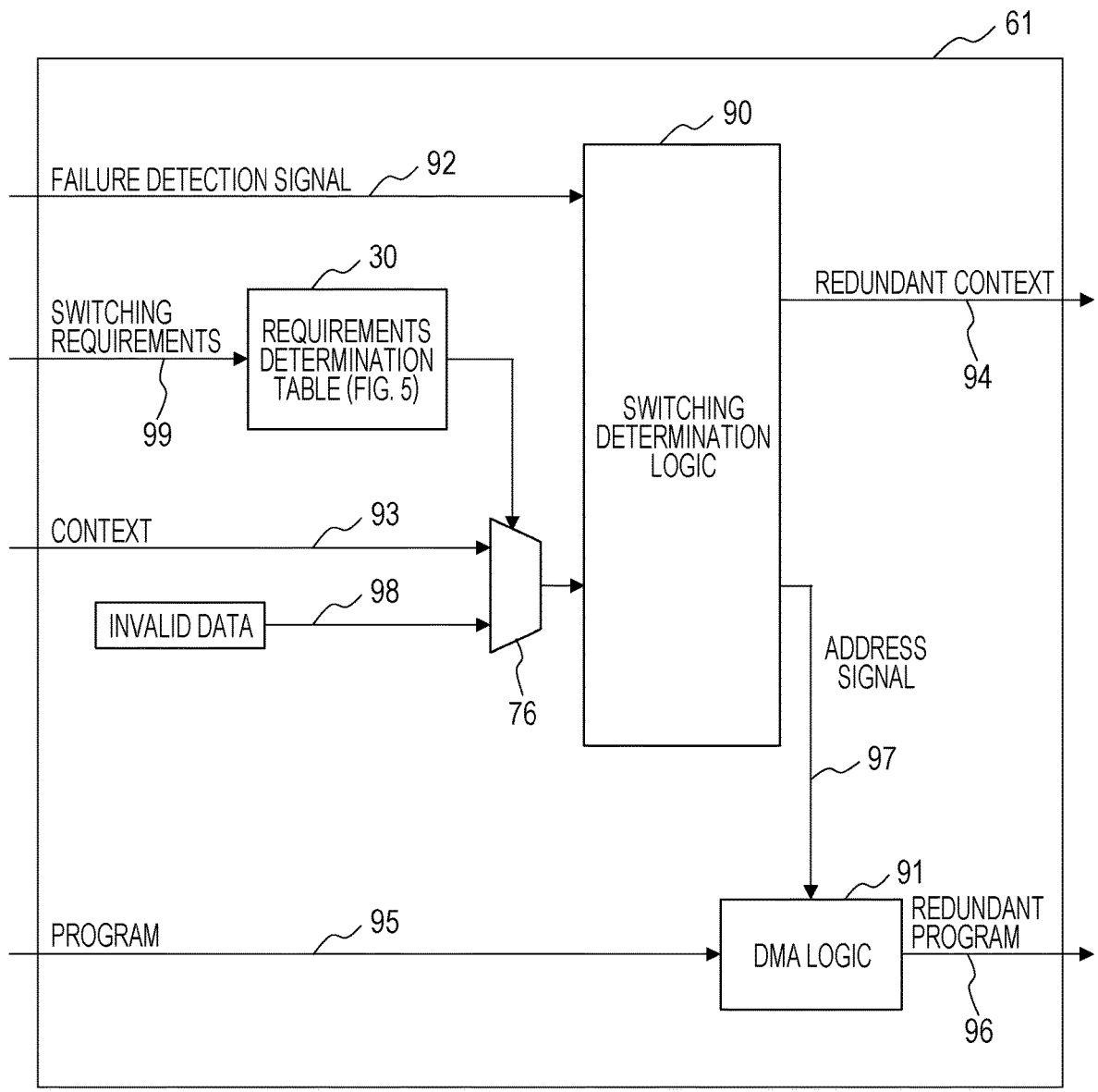
FIG. 4 is a block diagram illustrating a configuration example of a matching selection unit according to the first embodiment.

FIG. 4 is a block diagram illustrating the matching selection unit 61 according to the first embodiment. In a switching determination logic 90, redundant context data 94 is output to a region of the shared data D of the memory MD based on the failure detection signal 92 received from the common network 1 and a switching requirement 99 and the context 93 received from the common network 1. In this example, for example, when the occurrence of failure is detected by the failure detection signal 92 and it is determined that the failure occurs in the normal controller as a result of referring to a requirement determination table 30 using the switching requirement 99, the context 93 of the normal controller is output to the region of the shared data D of the memory MD via a multiplexer 76 as the redundant context data 94.

Note that, at this time, when the requirement determination table 30 determines that the switching requirement 99 is not a matching target (for example, a state before occurrence of failure), the requirement determination table 30 outputs invalid data 98 to the multiplexer 76 so as to select the invalid data instead of the context 93. As a result, in a state where no failure has occurred, the process of transmitting the context 93 as the redundant context 94 is invalidated, and when a failure of the normal controller occurs, the process of transmitting the context 93 of the normal controller as the redundant context 94 is executed.

In addition, in the switching determination logic 90, an address signal 97 of the controller to be switched is generated, and program data 95 from the non-volatile memory 63 is output as the program data 96 by the direct memory access (DMA) logic 91 according to the address signal 97 from the switching determination logic 90.

Next, the operation of the redundant controller CD of FIG. 2 will be described for each time axis. First, since the information on the failed controller is not obtained via the common network 1 in the state before the occurrence of failure, the switching determination logic 90 designates the address of the program PC as the address signal and holds the address in the memory MD as the redundant program 96. In addition, the highly available controller CC and the redundant controller CD have the same context at a stage before occurrence of failure.

As a result, when a failure occurs in the highly available controller CC, the arithmetic unit CPUD of the redundant controller CD can immediately execute function substitution and execute processing of the highly available controller CC without delay.

In addition, when it is determined from the information of the failed controller obtained via the common network 1 that the failed controller is the normal controllers CA and CB, the switching determination logic 90 of FIG. 4 designates the address signal 97 of the failed normal controller CA as an address signal, and holds the address signal in the memory MD as the redundant program 96. At this time, replacement processing is executed to the program PA instead of the program PC held until now. At this time, the switching determination logic 90 obtains the context data 93 of the failed controller to the redundant controller CD via the common network 1, and holds the context data as the redundant context data 96 in the region of the shared data D of the memory MD.

As a result, when a failure occurs in the normal controller CA, the arithmetic unit CPUD of the redundant controller CD can obtain the program PA of the normal controller CA newly rewritten and held in the memory MD to the redundant controller CD via the common network 1, and the context data CTXA held in the region of the shared data D of the memory MD reach a complete state, and thereafter, can execute function substitution and execute processing of the normal controller CA in succession.

FIG. 5 is an example for describing the requirement determination table 30 according to the first embodiment. In the table of the requirement determination table 30 illustrated in FIG. 5, No. (D31), a controller name D32, a processing content D33 in each controller, a control target D34 of each controller, and a switching allowable time D35 of each controller are illustrated in order from the left column.

For example, No. 1 indicates that the controller name D32 is the controller CA, the processing content D33 of the controller CA is a data input, the control target D34 of the controller CA is an image sensor, and the switching allowable time D35 of the controller CA is 5.00.

Similarly, No. 2 indicates that the controller name D32 is the controller CB, the processing content D33 of the controller CB is calculation, and the switching allowable time D35 of the controller CB is 0.85, and No. 3 indicates that the controller name D32 is the controller CC, the processing content D33 of the controller CC is actuation, the control target D34 of the controller CC is a motor, and the switching allowable time D35 of the controller CC is 0.01.

Here, since the controller CC has the shortest allowable time D35 for switching when a failure occurs among the plurality of controllers, the controller CC can be regarded as, for example, a highly available controller that requires high availability. On the other hand, since the controller CA has the longest allowable time for switching when a failure occurs in the controller CA, the controller CA can be regarded as, for example, a normal controller that does not require high availability. Similarly, since the controller CB has a longer allowable time for switching when a failure occurs than the controller CA, the controller CB can be regarded as a normal controller that does not require the high availability.

Figure 6:
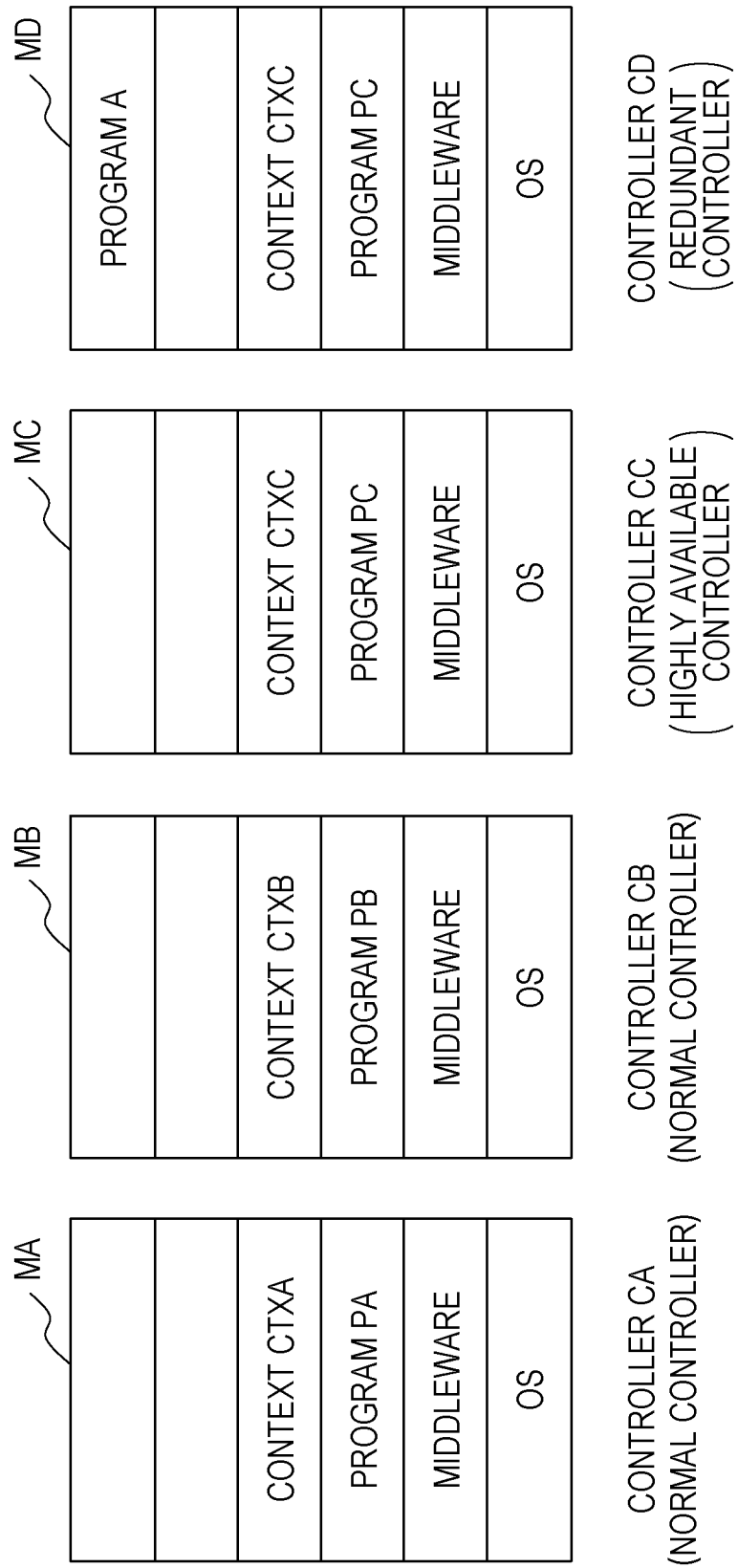
FIG. 6 is a diagram illustrating an example of data in a memory of each controller in the control system according to the first embodiment.

FIG. 6 is an example for explaining in-memory data of each controller in the control system according to the first embodiment. The memory MA of the controller CA stores an operating system (OS), middleware, a program PA, and a context CTXA in order from the bottom of the memory address. Similarly, the memory MB of the controller CB and the memory MC of the controller CC store the program P and the context CTX of each controller in addition to the common OS and middleware.

Here, the memory MD of the redundant controller CD stores the program PC and the context CTXC of the controller CC in addition to the common OS and middleware.

As a result, when a failure occurs in the controller CC which is a highly available controller, the control can be immediately switched to the redundant controller CD.

In addition, since there is an unused region in the memory MD, for example, in a case where the redundant controller CD is replaced when the controller CA fails, the program PA of the controller CA can be loaded and executed in the unused region of the memory MD. Note that the illustrated image describes that a failure of the controller CA is assumed before the occurrence of failure and the program is prepared in advance, and as long as the context CTXA can be secured by this, switching can be immediately performed.

Figure 7:
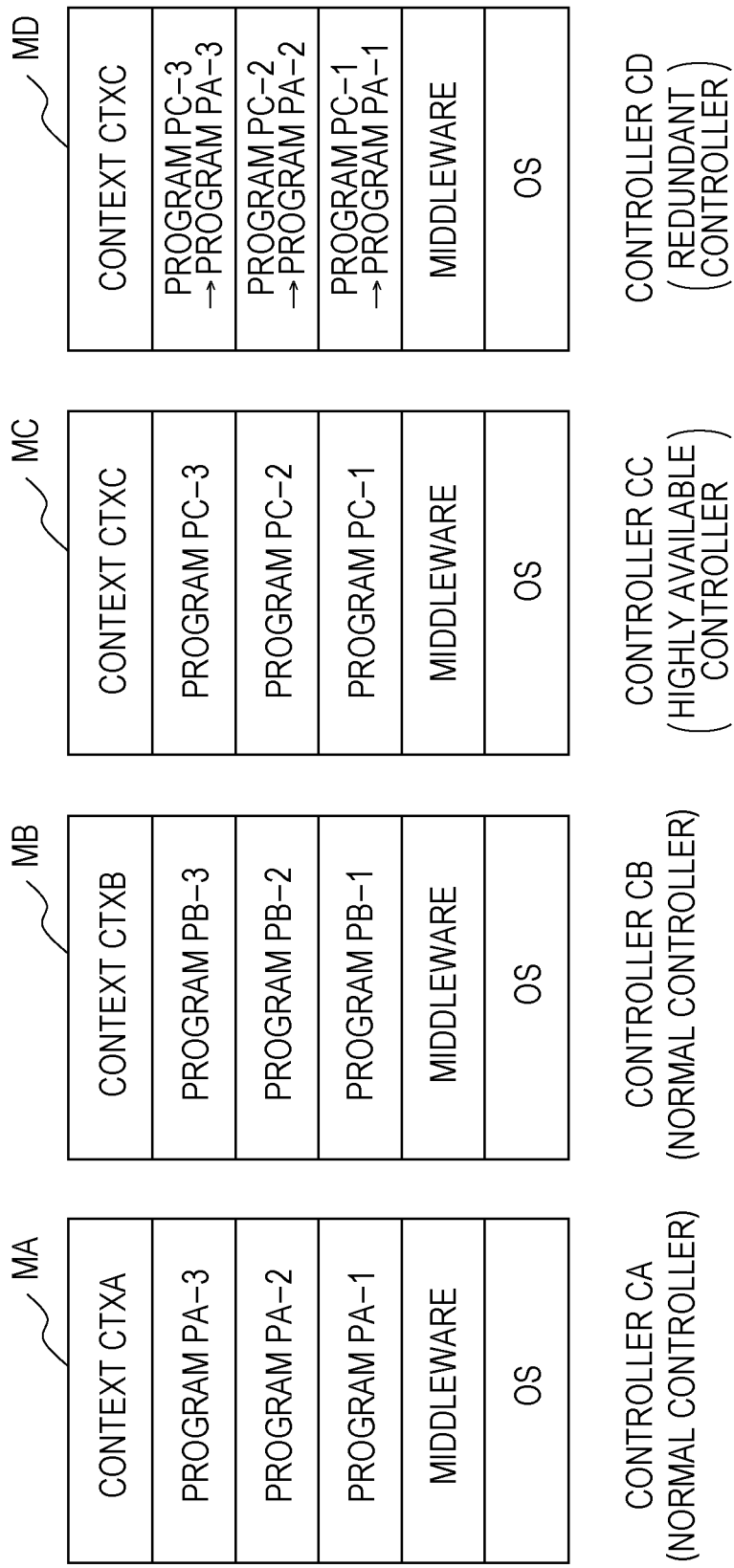
FIG. 7 is a diagram illustrating an example of data in a memory of each controller in the control system according to the first embodiment.

FIG. 7 is another example for explaining in-memory data of each controller in the control system according to the first embodiment. The in-memory data illustrated in FIG. 7 is different from the example of the in-memory data described in FIG. 6 in that the program PA of the controller CA is the programs PA-1, PA-2, and PA-3, the program PB of the controller CB is the programs PB-1, PB-2, and PB-3, the program PC of the controller CC is the programs PC-1, PC-2, and PC-3, and the program PC of the redundant controller CD is the programs PC-1, PC-2, and PC-3.

Since there is no free space in the memory MD, for example, in a case where the redundant controller CD is replaced when the controller CA fails, the processing can be executed by loading the programs PA-1, PA-2, and PA-3 of the controller CA to the regions of the programs PC-1, PC-2, and PC-3 of the memory MD, respectively.

Figure 8:
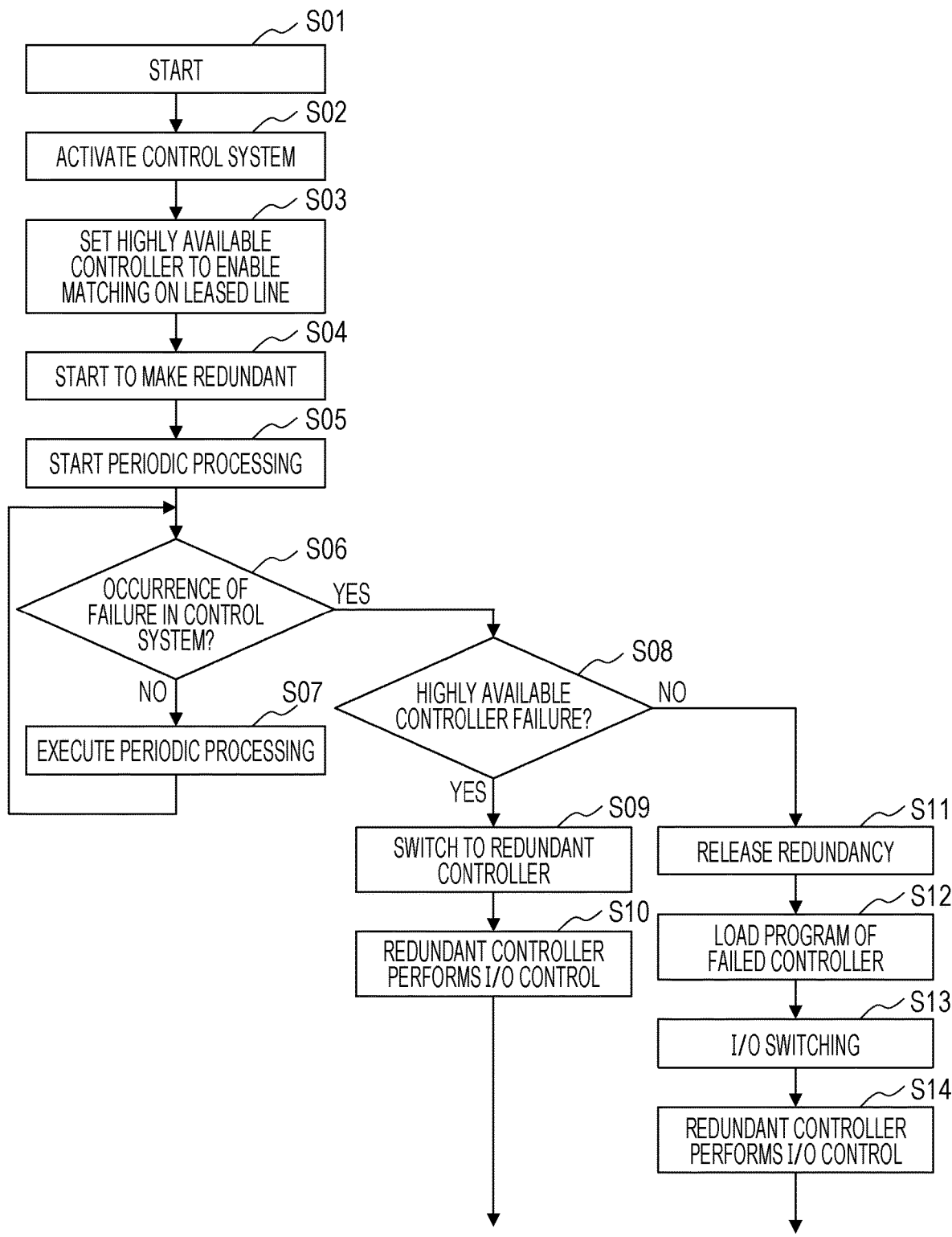
FIG. 8 is a flowchart for explaining an example of an operation when matching is performed in the control system according to the first embodiment.

FIG. 8 is an example of a flowchart for explaining the operation of the control system according to the first embodiment. In this flow, first, in processing step S01, an operation flow of the control system is started. In processing step S02, the control system is activated.

Next, in processing step S03, the matching selection unit 61 enables matching of the controllers CC, and the leased line 27 is set to match the context data of the highly available controller CC and the redundant controller CD. By handling the controller CC as the highly available controller CC, other controllers CA and CB are handled as normal controllers.

Processing step S04 is a processing step in which the redundant controller CD starts redundancy. In processing step S05, the control system starts the periodic processing at a constant control period. With the processing so far, the control system enters the normal operation state, and the controllers CA, CB, and CC start to function as input, calculation, and output controllers, respectively.

Processing step S06 is a processing step of determining whether or not a failure has occurred in the control system. In a case where a failure has occurred, the process proceeds to processing step S08, but in a case where no failure has occurred, the process proceeds to processing step S07 and the periodic processing is continued.

The processing step S08 is a processing step of determining whether or not the failed controller is the highly available controller CC or the normal controllers CA and CB when a failure occurs in the controller of the control system. In a case where the failed controller is the highly available controller CC, the process proceeds to processing step S09, but in a case where the failed controller is the normal controllers CA and CB, the process proceeds to processing step S11.

In the processing step S09 when the failed controller is the highly available controller CC, the failed highly available controller CC is switched to the redundant controller CD. In this state, as described with reference to FIGS. 2 and 4, since the program PC of the highly available controller CC and the context CTXC are matched and held in the memory MD of the redundant controller CD, this switching is immediately executed. At this time, the arithmetic unit CPUD of the redundant controller CD executes calculation using the redundant program 96 obtained from the non-volatile memory 63 via the matching selection unit 61 and stored in the memory MD and the matching context CTXC obtained from the leased line 27 via the matching unit 62 and stored in the memory MD, and gives the processing result to the actuator 8 as the actuator output 23 and controls the same.

In addition, in the processing step S10, the redundant controller CD executes I/O control of the highly available controller CC and performs processing after switching. As a result, the redundant controller CD substitutes the output function to the plant 100 performed by the failed highly available controller CC.

On the other hand, the processing step S11 when the failed controllers are the normal controllers CA and CB is a processing step of switching the failed normal controllers CA and CB to the redundant controller CD. At this time, since the redundant controller CD performs matching processing with the highly available controller CC, processing of releasing redundancy of the redundant controller CD is performed.

Next, in processing step S12, since the program PC of the highly available controller CC and the context CTXC are matched and held in the memory MD of the redundant controller CD, the programs PA and PB of the failed normal controllers CA and CB are loaded into the memory MD of the redundant controller CD. Thereafter, the arithmetic unit CPUD of the redundant controller CD executes calculation using the redundant program 96 (programs PA, PB of normal controllers CA, CB) obtained from the non-volatile memory 63 via the matching selection unit 61 and stored in the memory MD and the redundant context data (CTXA, CTXB) obtained from the common network 1 via the matching selection unit 61 and stored in the memory MD as the shared data D.

In processing step S13, I/O switching is performed from the failed normal controllers CA and CB to the redundant controller CD, and in processing step S14, I/O control is performed by the redundant controller CD loaded with the programs of the normal controllers CA and CB. As a result, in the processing after the switching, the redundant controller CD gives the processing result in the processing step S12 to the actuator 8 as the actuator output 23 and controls the actuator 8.

Through the series of processing steps, the control system described in the present embodiment performs the switching operation when the failure occurs in the controller.

According to the processing flow of FIG. 8, the handling of the context CTX is particularly different between the failure in the highly available controller CC and the failure in the normal controllers CA and CB. The failure of the highly available controller CC is obtained from the leased line 27 and is always in the switching standby state, whereas the failure of the normal controllers CA and CB is obtained from the common network 1. As a result, in the former, high-speed switching can be performed, whereas in the latter, which has a long processing cycle and thus has time to spare for responding to a failure, such urgency is not necessary, so that it is possible to sufficiently respond even via the common network 1. In each case, the program stored in the non-volatile memory 63 of the redundant controller CD is used, and there is no significant difference in handling.

According to the present embodiment, in a control system including a plurality of controllers, equipment cost and maintenance cost can be significantly reduced without significantly increasing the number of additional controllers for improving availability.

Second Embodiment

Figure 9:
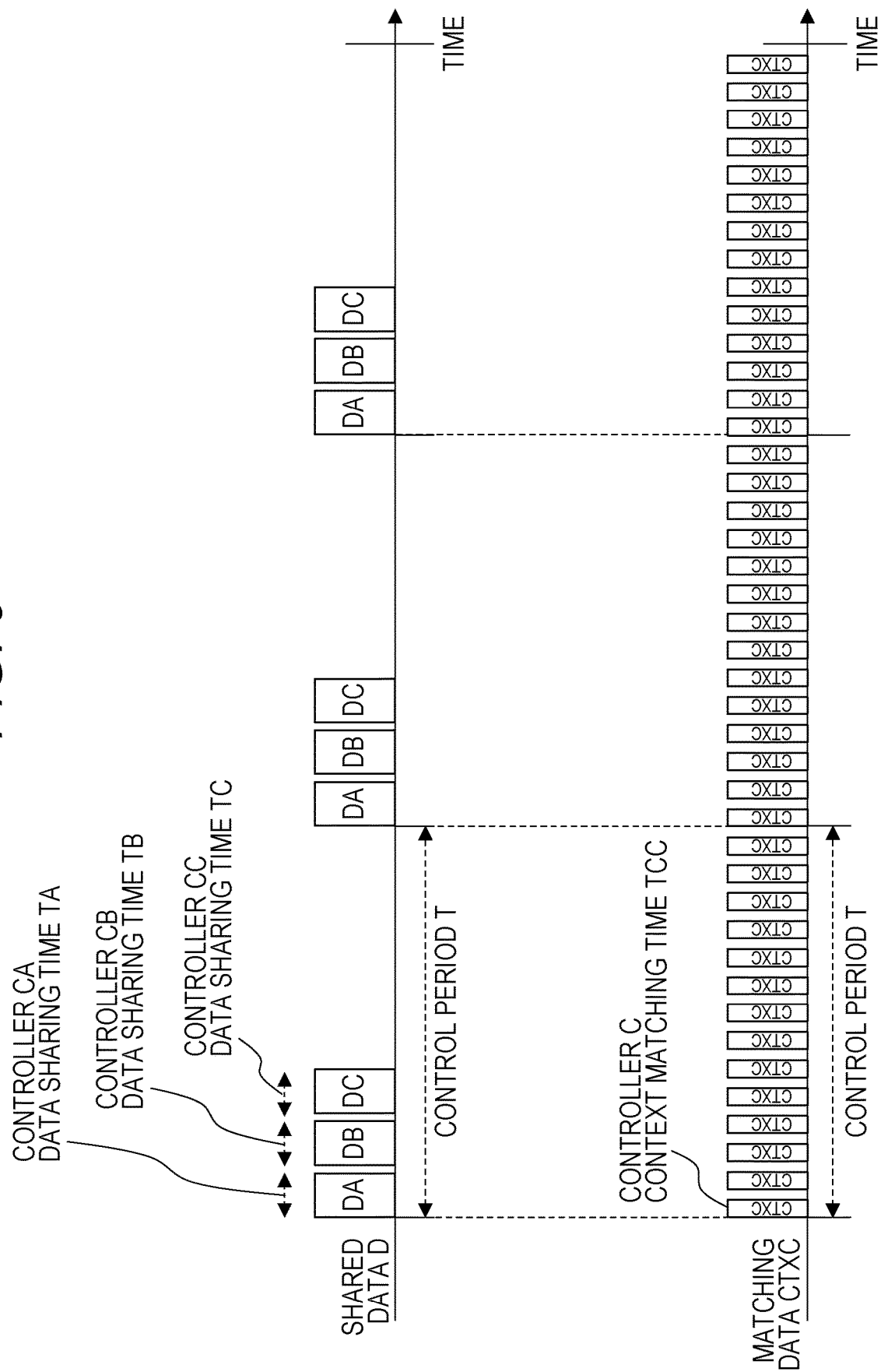
FIG. 9 is a diagram illustrating a timing chart for explaining data sharing timing in a control system according to a second embodiment.

A control system according to a second embodiment will be described. FIG. 9 is a diagram illustrating an example of a timing chart for explaining data sharing timing in a control system according to the second embodiment.

Two timing charts illustrated in FIG. 9 illustrate a state in which the control system performs processing based on a predetermined control period.

The upper timing chart of FIG. 9 indicates that the shared data D (DA, DB, DC) of the controller CA, the controller CB, and the controller CC is shared at a head of a control period T. In this example, when the controller CA shares the data TA at the earliest position of the control period T and the data sharing time TA of the controller CA ends, the controller CB next shares the data DB, when the data sharing time TB of the controller CB ends, the controller CC finally shares the data DC, when the data sharing time TC of the controller CC ends, the CPU of the controller C executes another processing such as calculation or control until the next control period start time.

The timing chart on the lower side of FIG. 9 indicates that the context CTXC of the controller CC is matched with the redundant controller CD through the control period T.

As illustrated in FIGS. 2 and 4, in a case where the matching is enabled by the matching selection unit 61, the matching of the contexts CTXC ends in a short time by the matching unit 62 and the leased line 27, and thus, it is possible to execute the context matching processing a plurality of times in one control period T. Therefore, the context of the controller CC in one control period T matches the latest operation state with the redundant controller CD.

According to the present embodiment, in the control system including the plurality of controllers, it is possible to ensure high availability of the controller having a short switching allowable time at the time of the occurrence of failure.

Furthermore, in a case where the normal controller fails, since data is shared at the beginning of the control period, the normal controller is taken over using the shared data in the next cycle in which the failure occurs, and the continuity of the processing can be secured.

Third Embodiment

Figure 10:
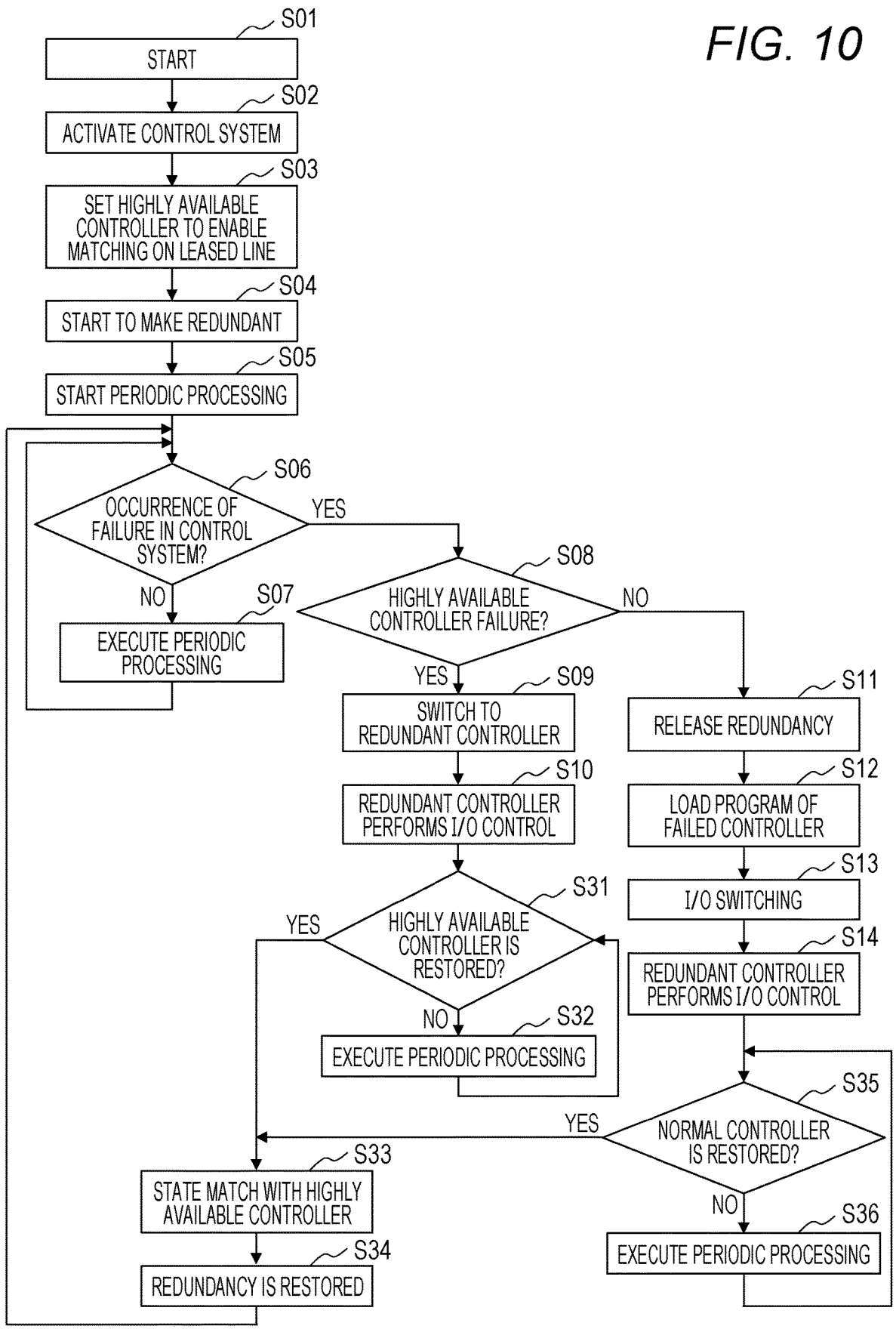
FIG. 10 is a flowchart illustrating an example of an operation when the control system according to a third embodiment is activated, a failure occurs in the controller, and the controller is recovered.

A control system according to a third embodiment will be described. FIG. 10 is an example of a flowchart for explaining an operation when a failure occurs in a plurality of controllers and the controllers are recovered in the control system according to the third embodiment.

In the flowchart illustrated in FIG. 10, the operations from the processing step S01 to the processing step S14 are the same as those of the flowchart illustrated in FIG. 8, and the recovery processing on the highly available controller CC side is described in the processing steps S31 to S34, and the recovery processing on the normal controllers CA and CB side is described in the processing step S35 and the processing step S36.

First, in the recovery processing on the highly available controller CC side, it is determined in processing step S31 whether or not the failed highly available controller CC has been recovered. If it has not been recovered, the process proceeds to processing step S32 to execute the periodic processing, but if it has been recovered, the process proceeds to processing step S33.

In the recovery processing on the normal controllers CA and CB side, it is determined in processing step S35 whether or not the failed normal controller is recovered. If it has not been recovered, the process proceeds to processing step S36 to execute the periodic processing, but if it has been recovered, the process proceeds to the processing step S33.

In any case, when the recovery is confirmed, the operation states of the highly available controller CC and the redundant controller CD are matched in the processing step S33. Thereafter, in the processing step S34, the redundancy of the redundant controller CD is recovered, and the process proceeds to the periodic processing of the processing step S06.

Through the series of processing steps, the control system described in the present embodiment performs the switching operation when the failure occurs in the controller, and a recovery operation when the failure of the controller is recovered.

Figure 11:
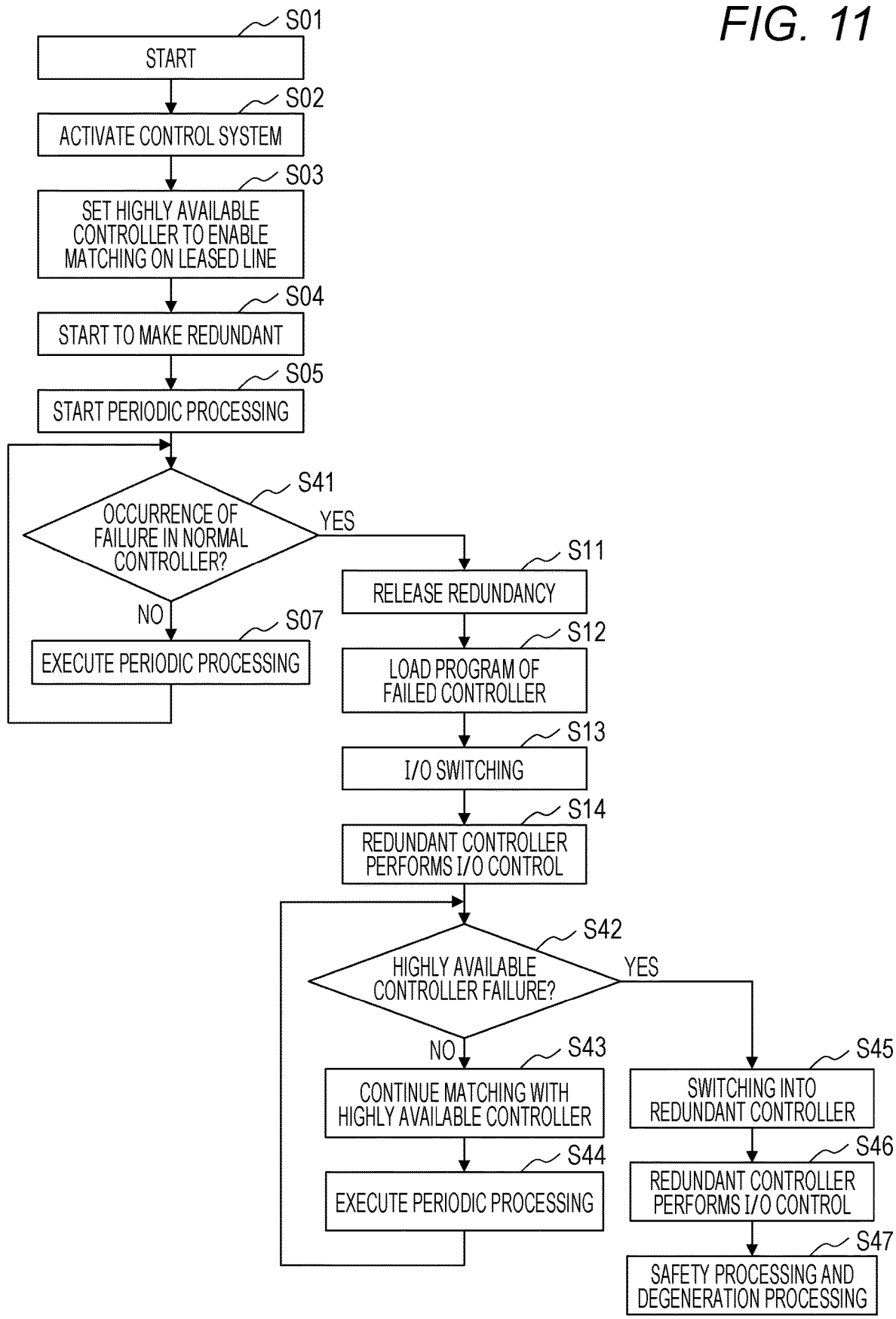
FIG. 11 is a flowchart for explaining an example of an operation in a case where the control system according to the third embodiment is activated, a failure occurs in the controller, and a failure occurs in still another controller before recovery.

FIG. 11 is an example of a flowchart for explaining an operation in a case where a failure occurs in a controller and a failure occurs in still another controller before recovery in the control system according to the third embodiment. Here, the handling at the time of the progress failure in which the failure of the other of the normal controllers CA and CB or the highly available controller CC occurs after the failure of the normal controllers CA and CB will be described.

In the flowchart illustrated in FIG. 11 illustrating the processing at the time of the progress failure, the operations from processing step S01 to processing step S05 are the same as those in the flowchart illustrated in FIG. 8.

Processing step S41 is a processing step of determining whether or not a failure has occurred in the normal controllers CA and CB of the control system. In a case where a failure has occurred in the normal controllers CA and CB, the process proceeds to processing step S11, but in a case where no failure has occurred, the process proceeds to processing step S07 and the periodic processing is continued.

In addition, the operations from the processing steps S11 to S14 in the flowchart illustrated in FIG. 11 are the same as those in the flowchart illustrated in FIG. 8, and the redundant controller CD substitutes the functions of the normal controllers CA and CB.

Processing step S42 is a processing step of determining whether or not the failed controller is a highly available controller when a failure occurs in still another controller in the control system. If the controller is not a highly available controller, the process proceeds to processing step S43, and if the controller is a highly available controller, the process proceeds to processing step S45.

In the processing step S43 when the progress failure is another normal controller, when the controller that has failed is not the highly available controller, the redundant controller continues matching with the highly available controller, and the periodic processing is executed in processing step S44.

Note that, in the description of the processing step S43, only that the redundant controller CD continues matching with the highly available controller CC is described, but the following measures are also actually executed. For example, this state is a state in which the normal controller CA has failed first and the redundant controller CD has replaced the normal controller CA, and a state in which the normal controller CB has failed next. At this time, as the redundant controller CD, any one of the following measures is taken:

substitution including the function of the normal controller CB is performed if there is reserve power, substitution of only the function of any normal controller is performed if there is no reserve power, and execution of a part of the functions of the normal controllers CA and CB is performed in a degenerated state; however, but it is useful to substitute only the function of any normal controller from the viewpoint of low cost. In any case, matching between the program and the context is continued with the highly available controller CC even in that case.

The processing step S45 in a case where the progress failure is the highly available controller CC is a processing step of switching the failed highly available controller CC to the redundant controller CD. In the memory MD of the redundant controller CD, since the program PC of the highly available controller CC and the context CTXC are matched and held, this switching is immediately executed. Thereafter, in processing step S46, the redundant controller executes I/O control of the highly available controller, and performs processing after switching.

In processing step S47, since two controllers fail and the redundant controller is in a state of substitution processing for one controller, an operation to execute safety processing and degeneration processing of the entire control system is performed.

Through the series of processing steps, the control system described in the present embodiment performs safety processing and degeneration processing in a case where a failure occurs in a plurality of controllers.

According to the present embodiment, by providing one redundant controller in a distributed control system in which each controller performs different processing, it is possible to provide a control system that realizes low-cost redundancy in which the entire system can continue operation even when a failure occurs in some controllers.

Furthermore, even in a case where the control targets of some controllers have a short switching allowable time, switching can be performed immediately by matching of the redundant controllers, and even in a failure of the controller having a long switching allowable time, the redundant controller can load a program of the failed controller and perform alternative processing.

In the third embodiment, the controller CD as the redundant controller is matched with the controller CC. However, the controller CD may be matched with another controller. Although the example in which three controllers and one redundant controller are connected to the common network 1 has been described, the number of controllers may be different from each other.

Fourth Embodiment

Figure 12:
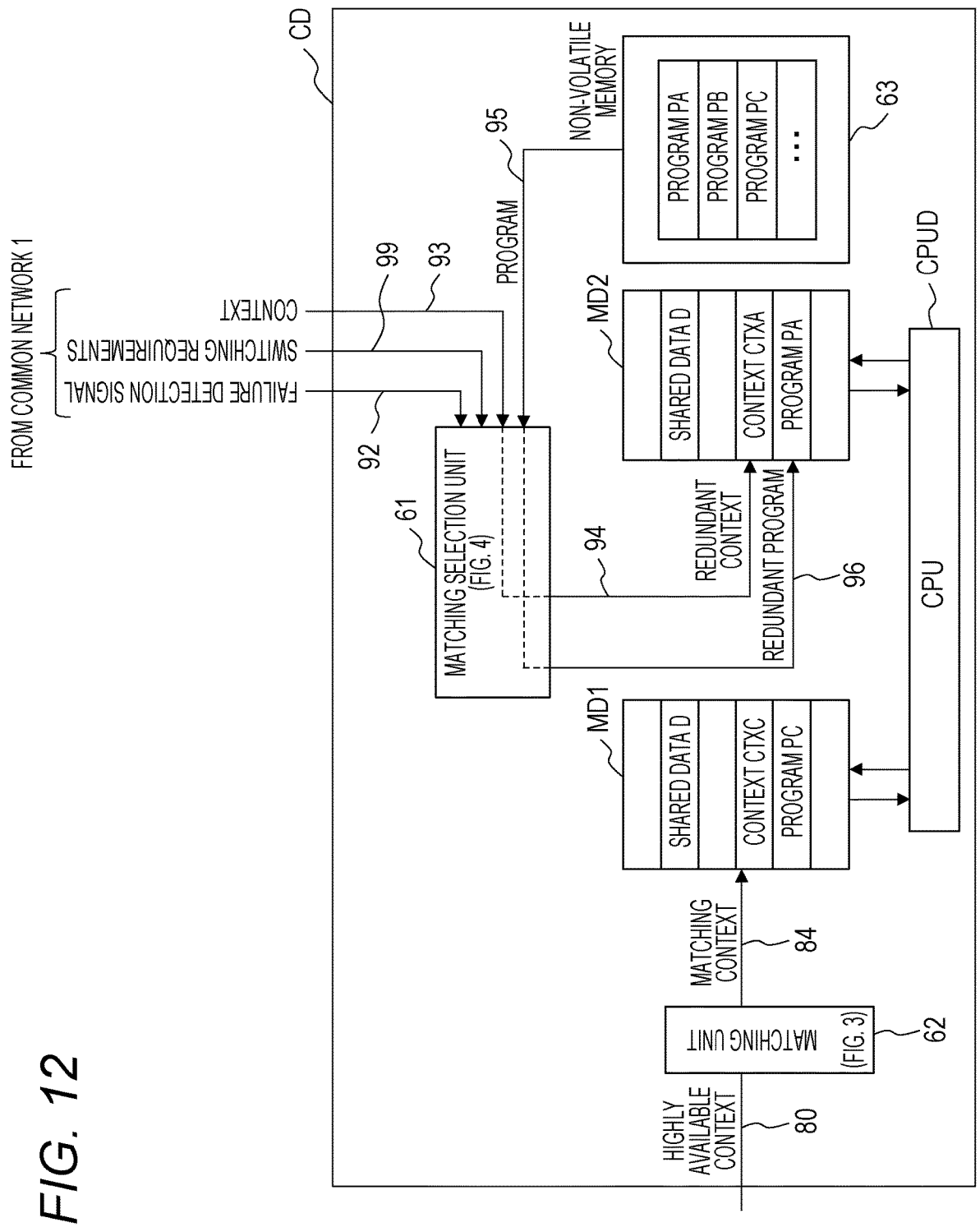
FIG. 12 is a block diagram for explaining an example of a redundant controller according to a fourth embodiment.

A control system according to a fourth embodiment will be described. FIG. 12 is a block diagram illustrating a redundant controller in the control system according to the fourth embodiment.

The redundant controller CD described in the present embodiment is different from the block diagram of the redundant controller CD described in FIG. 2 in that a memory MD2 storing the program PA and the context CTXA is added, and the matching selection unit 61 and the CPUD are connected. In addition, the memory MD1 always stores the program PC and the context CTXC of the highly available controller CC.

According to the present embodiment, by newly preparing a memory that stores data for switching in a case where the highly available controller fails, the redundant controller CD can continue matching in a case where the highly available controller newly fails in a state where the normal controller fails, and it is possible to provide a control system that achieves both high availability and low cost.

Fifth Embodiment

Figure 13:
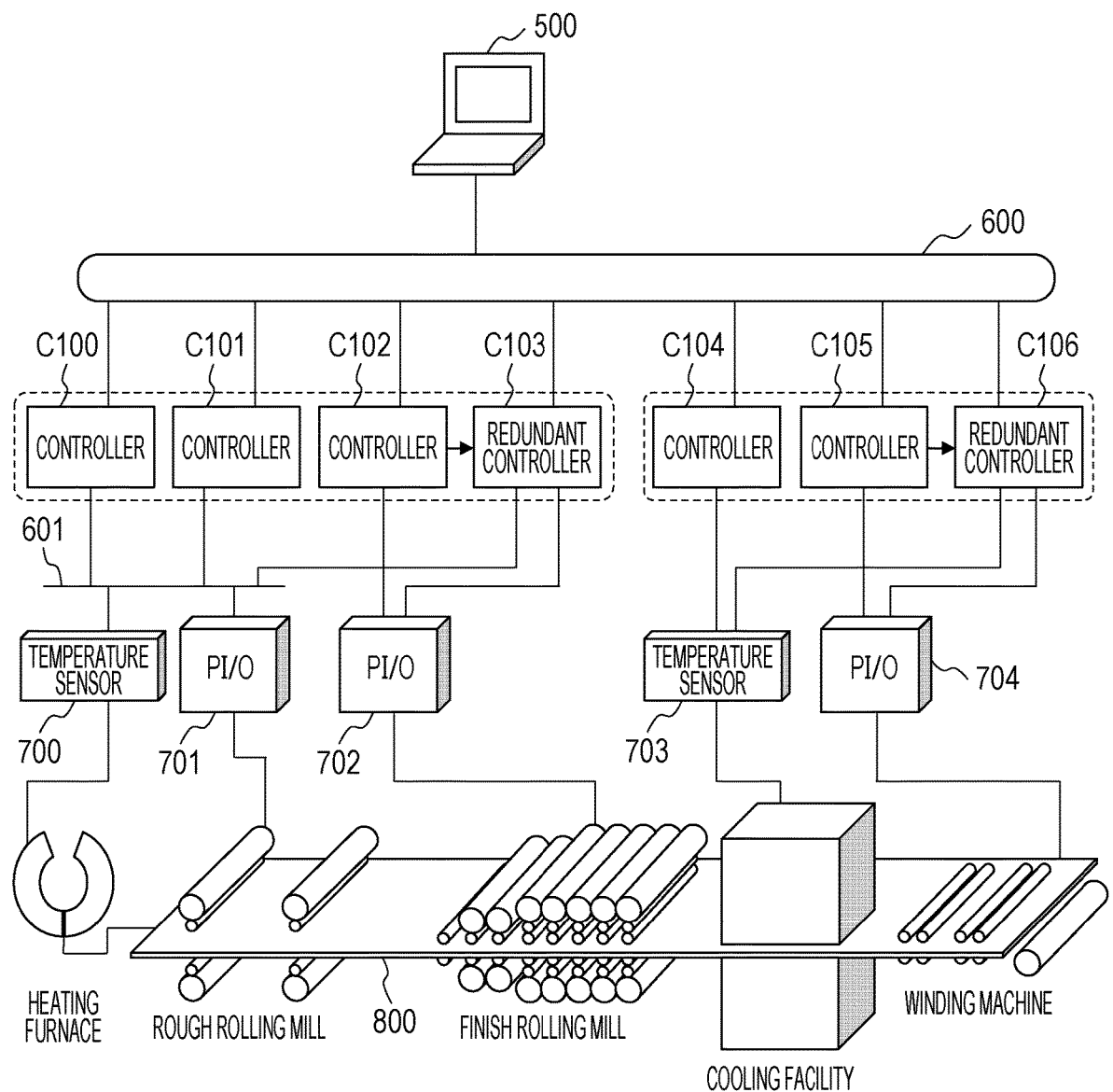
FIG. 13 is a diagram illustrating an example of a case where a control system according to a fifth embodiment is applied to a steel system.

A case where the control system of the present invention is applied to a steel system will be described. FIG. 13 is an explanatory diagram illustrating an example of a case where the control system of the present invention is applied to a steel hot-rolling facility.

In the hot-rolling facility described in the present embodiment, a terminal 500 connected to a common network 600 controls controllers C100, C101, C102, C104, and C105 and redundant controllers C103 and C106.

The steel heated in the heating furnace is charged into a hot-rolling facility 800. The temperature of the heating furnace obtained by a temperature sensor 700 is acquired by the controller C100 via a fieldbus 601. The controller C101 controls a programmable input/output (PI/O) 701 to adjust the rotation speed of the rough rolling mill, and the controller C102 controls the PI/O (702) to adjust the rotation speed and tension of the finish rolling mill. The temperature of a cooling facility obtained by a temperature sensor 703 is acquired by the controller C104. The controller C105 controls PI/O (704) to adjust the rotation speed and direction of a winding machine.

Here, high availability and reliability are required for the controller C102 that controls the finish rolling mill, which is important for purifying a high-quality steel sheet. Therefore, in the steel system described in a fifth embodiment, the redundant controller C103 is provided for the controller C102 that is a highly available controller with a short switching allowable time to perform the matching processing, and when a failure occurs in the controller C102, the controller C102 is immediately switched to the redundant controller C103 to continue the processing.

Here, since the controller C100 that controls the temperature sensor 700 and the controller C101 that controls the PI/O (701) are normal controllers with a long switching allowable time, when the controller C100 or the controller C101 fails, the redundant controller C103 loads a program and performs switching processing.

In addition, since the controller C105 that controls the winding machine, which is important in purifying the sophisticated steel sheet, is also a highly available controller, the redundant controller C106 is provided to perform the matching processing, and when a failure occurs in the controller C105, the controller C105 is immediately switched to the redundant controller C106 to continue the processing.

Since the controller C104 that controls the temperature sensor 703 is a normal controller, when the controller C104 fails, the redundant controller 106 loads a program and performs switching processing.

According to the present embodiment, it is possible to provide a steel system requiring high availability with low cost redundancy.

Sixth Embodiment

Figure 14:
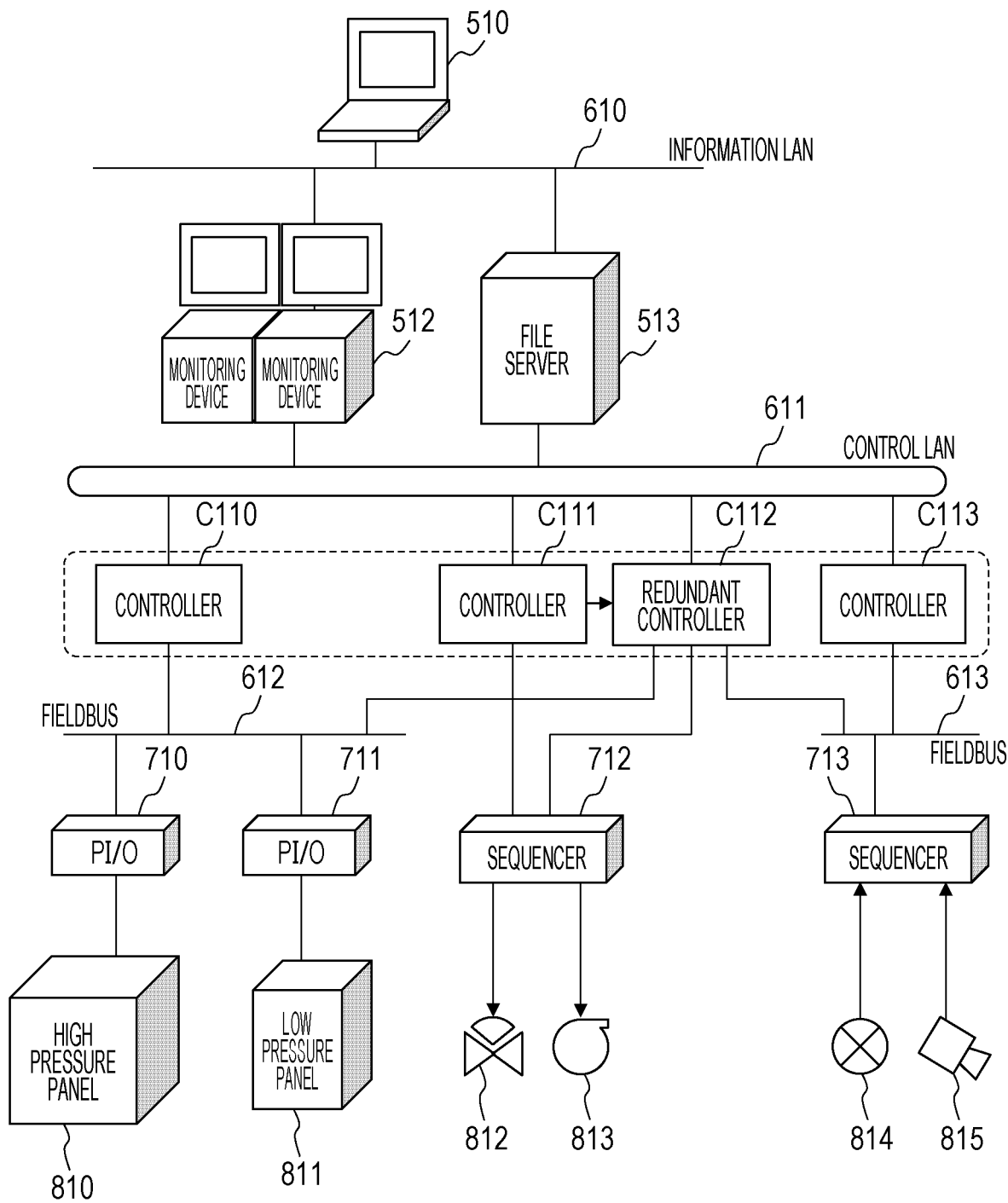
FIG. 14 is a diagram illustrating an example of a case where a control system according to a sixth embodiment is applied to a water treatment system.

A case where the control system of the present invention is applied to a water plant will be described. FIG. 14 is an explanatory diagram illustrating an example of a case where the control system of the present invention is applied to a water treatment system.

In the water treatment system described in the present embodiment, an information terminal 510, a monitoring device 512, and a file server 513 connected to the information LAN (610) control the controllers C110, C111, and C113 and the redundant controller C112 connected to the control LAN (611).

The water quality obtained by a water quality meter 814 and field image data captured by a camera 815 are collected by a sequencer 713 and acquired by the controller 113 via the fieldbus 613. The controller C113 shares data with the controller C111 and adjusts the amount of water sent by a pump 812 and a blower 813 via a sequencer 712. The controller C110 controls a high pressure panel 810 and a low pressure panel 811 from PI/O (710) and PI/O (711) via a fieldbus 612.

Here, in order to perform high quality water treatment, the controller C111 that controls the sequencer 712 connected to the pump 812 and the blower 813 is required to have high availability and reliability. Therefore, in the water treatment system described in a sixth embodiment, the redundant controller C112 is provided for the controller C111 that is a highly available controller with a short switching allowable time to perform the matching processing, and when a failure occurs in the controller C111, the controller C111 is immediately switched to the redundant controller C112 to continue the processing.

Here, since the controller C113 that controls the water quality meter 814 and the camera 815 and the controller C110 that controls the high pressure panel 810 and the low pressure panel 811 are normal controllers with a long switching allowable time, when the controller C113 or the controller C110 fails, the redundant controller C112 loads a program and performs switching processing.

According to the present embodiment, it is possible to provide a water treatment system requiring high availability with low cost redundancy.

Seventh Embodiment

Figure 15:
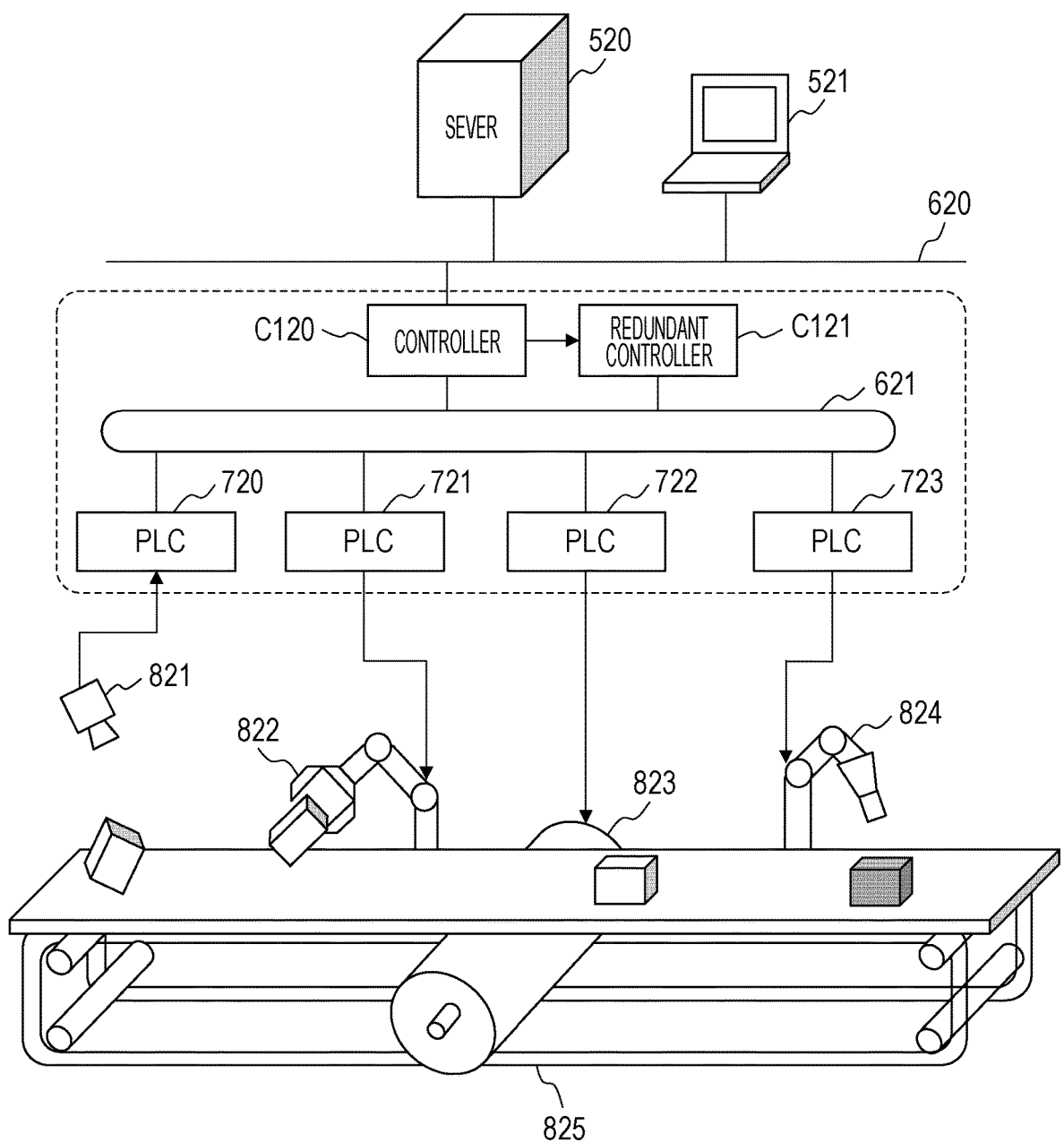
FIG. 15 is a diagram illustrating an example of a case where a control system according to a seventh embodiment is applied to an FA system.

A case where the control system of the present invention is applied to a FA system will be described. FIG. 15 is an explanatory diagram illustrating an example of a case where the control system of the present invention is applied to the FA system.

The FA system described in the present embodiment controls a controller C120 and a redundant controller C121 connected to the control LAN (621) by a server 520 and a monitoring terminal 521 connected to the information LAN (620).

The product placed on a belt conveyor 825 is photographed by a camera 821, shape data is processed by a programmable logic controller (PLC) 720, and a PLC (721) controls a picking robot 822 to place the product at a predetermined position. A conveyor motor 823 controlled by a PLC (722) moves the belt conveyor 825 at a predetermined speed, and a coating robot 824 controlled by a PLC (723) coats the surface of the product.

In this FA system, since the PLC necessary for controlling the belt conveyor 825 is collectively controlled by the controller C120, the controller C120 needs to be highly available and highly reliable in order to perform high-quality coating. Therefore, in the FA system described in a seventh embodiment, the redundant controller C121 is provided for the controller C120 that is a highly available controller with a short switching allowable time to perform the matching processing, and when a failure occurs in the controller C120, the controller C120 is immediately switched to the redundant controller C121 to continue the processing.

According to the present embodiment, it is possible to provide an FA system requiring high availability as the entire control system with low cost redundancy.

Eighth Embodiment

Figure 16:
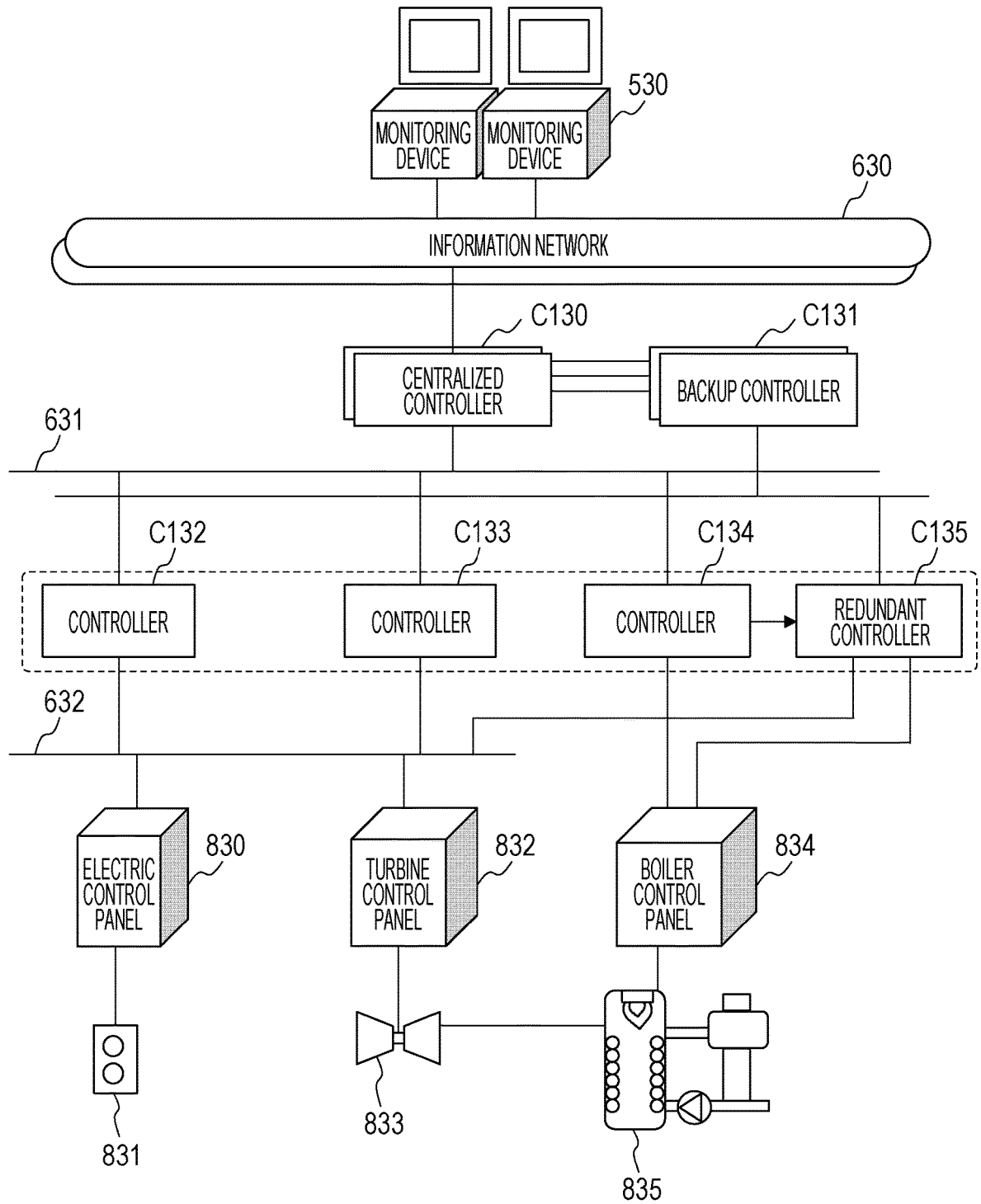
FIG. 16 is a diagram illustrating an example of a case where a control system according to an eighth embodiment is applied to a power generation control system.

A case where the control system of the present invention is applied to a power generation control system will be described. FIG. 16 is an explanatory diagram illustrating an example of a case where the control system of the present invention is applied to the power generation control system.

In the power generation control system described in the present embodiment, a centralized controller C130 and a backup controller C131 connected to the duplicated control network 631 are controlled by the monitoring device 530 connected to the duplicated information network 630. The centralized controller C130 is duplicated, and when a failure is detected in the centralized controller C130, the processing is performed by switching to the duplicated backup controller C131.

In this power generation control system, when a switch 831 is pressed, the system is activated by being transmitted to a controller C132 via the electric control panel 830, a boiler control panel 834 that controls a combusting boiler 835 is controlled by a controller C134, the rotation speed of a rotating turbine 833 is monitored by a controller C133 via a turbine control panel 832, and the entire control is performed in such a manner as to be transmitted to the monitoring device 530 via the network.

The controller C134 that controls the boiler control panel 834, which is important for safe power generation, is required to have high availability and reliability. Therefore, in the power generation control system illustrated in an eighth embodiment, the redundant controller C135 is provided for the controller C134 that is a highly available controller with a short switching allowable time to perform the matching processing, and when a failure occurs in the controller C134, the controller C134 is immediately switched to the redundant controller C135 to continue the processing.

Here, since the controller C132 that controls the switch 830 and the controller C133 that controls the turbine 832 are normal controllers with a long switching allowable time, when the controller C132 or the controller C133 fails, the redundant controller C135 loads a program and performs switching processing.

According to the present embodiment, it is possible to provide the power generation control system requiring high availability as the entire control system with low cost redundancy.

Note that the control system described in these embodiments can be used in various systems such as an elevator control system, a railway control system, an automobile control system, and a construction machine control system.

In addition, the present invention is not limited to the above-described embodiments, and includes various modifications. For embodiment, the above-described embodiments describe the control system in detail and specifically in order to describe the present invention in an easy-to-understand manner, and are not necessarily limited to those having all the described components. In addition, some of the components of a certain embodiment can be replaced with some of the components of another embodiment. In addition, it is also possible to add the components of another embodiment to the components of a certain embodiment. In addition, it is also possible to add, delete, or replace some of other constituent elements with respect to some of the constituent elements of each embodiment.

What is claimed is:

1. A control system in which a plurality of controllers and a redundant controller are connected to a common network,
wherein the plurality of controllers are divided into a highly available controller and other normal controllers,
wherein the redundant controller obtains context data of the highly available controller to hold the context data in a first memory, holds programs of the plurality of controllers in a non-volatile memory, and holds the program of the highly available controller in the first memory,
wherein the redundant controller obtains information on occurrence of a failure in the controller via the common network, transfers the program of the normal controller in which the failure has occurred from the non-volatile memory to a second memory, obtains context data of the normal controller in which the failure has occurred via the common network, and holds the context data in the second memory, and
wherein the redundant controller includes a central processing unit (CPU) that substitutes processing of the highly available controller by using the context data and the program of the highly available controller held in the first memory when a failure occurs in the highly available controller, and substitutes processing of the normal controller by using context data and a program of the normal controller held in the second memory when a failure occurs in the normal controller.

2. A control method for a control system in which a plurality of controllers and a redundant controller are connected to a common network, the plurality of controllers being divided into a highly available controller and other normal controllers, the method comprising, by the redundant controller:
obtaining context data of the highly available controller to hold the context data in a memory;
holding programs of the plurality of controllers in a non-volatile memory;
holding the program of the highly available controller in the memory;
substituting processing of the highly available controller by using the context data and the program of the highly available controller held in advance in the memory when a failure occurs in the controller;
obtaining information on occurrence of a failure in the controller via the common network;
transferring a program of the normal controller in which the failure has occurred from the non-volatile memory to the memory;
obtaining context data of the normal controller in which the failure has occurred via the common network to hold the context data in the memory; and
substituting processing of the normal controller by using the context data and the program of the normal controller held in the memory.

3. A control method for a control system in which a plurality of controllers and a redundant controller are connected to a common network, the plurality of controllers being divided into a highly available controller and other normal controllers, the method comprising, by the redundant controller:
a first step of obtaining context data of the highly available controller to hold the context data in a memory, holding programs of the plurality of controllers in a non-volatile memory, and holding the program of the highly available controller in the memory;
a second step of substitutes processing of the highly available controller by using the context data and the program of the highly available controller held in advance in the memory when a failure occurs in the highly available controller;
a third step of obtaining information on occurrence of a failure in the normal controller via the common network, transferring a program of the normal controller in which the failure has occurred from the non-volatile memory to the memory, obtaining context data of the normal controller in which the failure has occurred via the common network to hold the context data in the memory;
a fourth step of substituting processing of the normal controller by using the context data and the program of the normal controller held in the memory;
a fifth step of determining whether the failure occurs in the highly available controller or the normal controller and distinguishing and transitioning between the second step and the fourth step; and
a sixth step of transitioning to the first step after recovery from the failure.

4. A control method for a control system in which a plurality of controllers and a redundant controller are connected to a common network, the plurality of controllers being divided into a highly available controller and other normal controllers, the method comprising, by the redundant controller:
holding programs of the plurality of controllers in a non-volatile memory;
obtaining information on occurrence of a failure in the normal controller via the common network;
transferring a program of the normal controller in which the failure has occurred from the non-volatile memory to a memory;
obtaining context data of the normal controller in which the failure has occurred via the common network to hold the context data in the memory;
substituting processing of the normal controller by using the context data and the program of the normal controller held in the memory;
obtaining the context data of the highly available controller to hold the context data in the memory when obtaining information on occurrence of a failure in the highly available controller in a step of substituting the processing of the normal controller by the redundant controller via the common network;
holding a program of the highly available controller in a memory; and
degenerating processing of the highly available controller by using the context data and the program of the highly available controller held in advance in the memory when the failure occurs in the highly available controller.

* * * * *